United States Patent [19]
Zuzich et al.

[11] Patent Number: 5,302,728
[45] Date of Patent: Apr. 12, 1994

[54] POLYCONDENSATION OF PHENOLIC HYDROXYL-CONTAINING COMPOUNDS AND POLYHYDRIC ALCOHOLS AND THERMAL CONDENSATION TO FORM POLYETHERCYCLIPOLYOLS

[75] Inventors: Anne H. Zuzich; George C. Blytas, both of Houston, Tex.

[73] Assignee: Shell Oil Company, Houston, Tex.

[21] Appl. No.: 10,517

[22] Filed: Jan. 28, 1993

Related U.S. Application Data

[63] Continuation of Ser. No. 879,536, May 4, 1992, abandoned, which is a continuation of Ser. No. 672,199, Mar. 19, 1991, abandoned.

[51] Int. Cl.$^5$ .......................................... C07D 319/12
[52] U.S. Cl. .................................................... 549/378
[58] Field of Search ........................................ 549/378

[56] References Cited

U.S. PATENT DOCUMENTS

| | | |
|---|---|---|
| 2,062,404 | 12/1936 | Dreyfus ................ 549/378 |
| 2,487,208 | 11/1949 | Alsop . |
| 3,300,415 | 1/1967 | Ward .................... 549/378 |
| 3,425,960 | 2/1969 | Sandler et al. . |
| 3,548,010 | 12/1970 | Yoshino et al. . |
| 3,637,774 | 1/1972 | Babayan et al. . |
| 3,968,169 | 7/1976 | Seiden . |
| 4,802,998 | 2/1989 | Mueller et al. ............... 252/8.514 |
| 5,058,679 | 11/1991 | Hale et al. . |
| 5,072,794 | 12/1991 | Hale et al. . |
| 5,076,364 | 12/1991 | Hale et al. . |
| 5,076,373 | 12/1991 | Hale et al. . |
| 5,083,622 | 1/1992 | Hale et al. . |
| 5,085,282 | 2/1992 | Hale et al. . |
| 5,198,416 | 3/1993 | Hale et al. . |
| 5,198,532 | 3/1993 | Blytas et al. . |
| 5,204,444 | 4/1993 | Frank et al. . |
| 5,233,055 | 8/1993 | Blytas et al. . |

FOREIGN PATENT DOCUMENTS

| | | |
|---|---|---|
| 324887A | 1/1988 | European Pat. Off. ........ C09K 7/00 |
| 374671A | 12/1988 | European Pat. Off. ........ C09K 7/06 |
| 382070A | 2/1989 | European Pat. Off. ........ C09K 7/06 |
| 382071A | 2/1989 | European Pat. Off. ........ C09K 7/06 |
| 386636A | 3/1989 | European Pat. Off. ........ C09K 7/06 |
| 386638A | 3/1989 | European Pat. Off. ........ C09K 7/06 |
| 391251A | 4/1989 | European Pat. Off. ........ C09K 7/06 |
| 391252A | 4/1989 | European Pat. Off. ........ C09K 7/06 |
| 398112A | 5/1989 | European Pat. Off. ........ C09K 7/02 |
| 398113A | 5/1989 | European Pat. Off. ........ C09K 7/02 |
| 399270A1 | 5/1989 | European Pat. Off. ........ C09K 7/02 |
| 333984-A | 9/1989 | European Pat. Off. . |
| 374672A | 12/1989 | European Pat. Off. ........ C09K 7/06 |
| 3346097-A | 12/1983 | Fed. Rep. of Germany . |
| 3842692-A | 6/1990 | Fed. Rep. of Germany . |
| 43-19028 | 4/1964 | Japan . |
| 7021948-R | 6/1965 | Japan . |
| 44-26672 | 11/1969 | Japan . |
| 58-198429-A | 5/1982 | Japan . |
| 61043627-A | 8/1984 | Japan . |
| 61140534-A | 12/1984 | Japan . |
| 61-238749-A | 4/1985 | Japan . |
| 2216573A | 10/1989 | United Kingdom ......... C09K 7/02 |
| 2216574A | 10/1989 | United Kingdom ......... C09K 7/02 |
| 2223255A | 4/1990 | United Kingdom ......... C09K 7/06 |

*Primary Examiner*—Nicky Chan

[57] ABSTRACT

Polyethercyclicpolyols are prepared by thermally condensing a polyol having at least three hydroxyl groups of which at least two of the hydroxyl groups are vicinal, precursors of the polyol, cyclic derivatives of the polyol, or mixtures thereof, and controlling process conditions to avoid substantial undesirable degeneration. Lower molecular weight polyethercyclicpolyols are polycondensed with phenolic hydroxyl-containing compounds to form higher molecular weight polyethercyclicpolyols.

31 Claims, 1 Drawing Sheet

POLYCONDENSATION OF PHENOLIC HYDROXYL-CONTAINING COMPOUNDS AND POLYHYDRIC ALCOHOLS AND THERMAL CONDENSATION TO FORM POLYETHERCYCLIPOLYOLS

This is a continuation of application Ser. No. 879,536, filed May 4, 1992, now abandoned, which is a continuation of application Ser. No. 672,199, filed Mar. 19, 1991, now abandoned.

BACKGROUND OF THE INVENTION

This invention relates to polyethercyclicpolyols having high molecular weights and to the preparation thereof. In particular, the invention relates to the preparation of polyethercyclicpolyols which, due to improved molecular properties and characteristics, permit the preparation of improved drilling fluids which inhibit formation of gas hydrates, prevent shale dispersion, reduce swelling of the formation to improve wellbore stability, reduce fluid loss, and reduce filter cake thickness. Drilling muds incorporating the polyethercyclicpolyols of this invention are excellent substitutes for oil base muds in many applications.

Water-based drilling fluids comprise water, clays or polymers, and various treating agents which control the physical, chemical and/or rheological properties of drilling fluids in wellbores. In order to perform their function as drilling fluid additives, it is theorized, although the invention is not limited to this theory, that the polyethercyclicpolyol mixtures contain large water soluble molecules and have relatively limited crosslinking in view of their high molecular weight. It is difficult to produce polymeric molecules of this type of high molecular weight which do not have extensive crosslinking. Accordingly, the present invention provides a process which overcomes these and other problems in the art as more particularly disclosed hereinafter, and which produces polyethercyclicpolyols of significantly improved characteristics as drilling mud additives.

SUMMARY OF THE INVENTION

The purpose of the present invention is to form polyethercyclicpolyols by a thermal condensation reaction and copolymerization. This purpose is achieved by heating a reaction mixture comprising a reactant selected from the group consisting of (a) a polyol having at least three hydroxyl groups of which at least two of the hydroxyl groups are vicinal; (b) precursors of the polyol, (c) cyclic derivatives of the polyol, and (d) mixtures thereof, said heating initiating the thermal condensation; removing water formed during the thermal condensation; continuing the thermal condensation until a predetermined quantity of moles of water per mole of reactant are removed, wherein the condensation goes to completion without incurring substantial undesirable degeneration, and prior to the condensation going to completion, admixing a phenolic hydroxyl-containing compound with the reaction mixture. In another embodiment, the purpose of the invention is carried out by heating a reaction mixture comprising a reactant selected from the group consisting of (a) a polyol having at least three hydroxyl groups of which at least two of the hydroxyl groups are vicinal, (b) precursors of the polyol, (c) cyclic derivatives of the polyol, and (d) mixtures thereof, said heating initiating the thermal condensation; removing water formed during the thermal condensation; and continuing the thermal condensation, which is initially endothermic, until the condensation becomes essentially thermally neutral, prior to the reaction becoming exothermic which would lead to substantial undesirable degeneration, and prior to the condensation going to completion, admixing a phenolic hydroxyl-containing compound with the reaction mixture. In yet another embodiment, the purpose of this invention is realized by heating a reaction mixture comprising a reactant selected from the group consisting of (a) a polyol having at least three hydroxyl groups of which at least two of the hydroxyl groups are vicinal, (b) precursors of the polyol, (c) cyclic derivatives of the polyol, and (d) mixtures thereof, said heating initiating the thermal condensation; removing water formed during the thermal condensation; continuing the thermal condensation to completion while controlling the temperature and pressure of the reaction within predetermined ranges to avoid substantial undesirable degeneration and to maximize molecular weight, and prior to the condensation going to completion, admixing a phenolic hydroxyl-containing compound with the reaction mixture. Another embodiment of the invention achieves the purpose thereof by heating a reaction mixture comprising a reactant selected from the group consisting of (a) a polyol having at least three hydroxyl groups of which at least two of the hydroxyl groups are vicinal, (b) precursors of the polyol, (c) cyclic derivatives of the polyol, and (d) mixtures thereof, said heating initiating the thermal condensation; removing water formed during the thermal condensation; continuing the thermal condensation while adding additional reactant in such a manner that the reaction proceeds to completion at a rate faster than the additional reactant is being incorporated, thereby maximizing molecular weight of the polyethercyclicpolyol, and prior to the condensation going to completion, admixing a phenolic hydroxyl-containing compound with the reaction mixture. An additional embodiment of the invention achieves its purpose by heating a reaction mixture comprising a basic catalyst and a reactant selected from the group consisting of (a) a polyol having at least three hydroxyl groups of which at least two of the hydroxyl groups are vicinal, (b) precursors of the polyol, (c) cyclic derivatives of the polyol, and (d) mixtures thereof, said heating initiating the thermal condensation; removing water formed during the thermal condensation; continuing the thermal condensation to completion while controlling the temperature and pressure of the reaction within predetermined ranges to avoid substantial undesirable degeneration and to maximize molecular weight, and prior to the condensation going to completion, admixing a phenolic hydroxyl-containing compound with the reaction mixture. The above stated purpose of the invention may also be realized by heating a reaction mixture comprising a reactant selected from the group consisting of (a) a polyol having at least three hydroxyl groups of which at least two of the hydroxyl groups are vicinal, (b) precursors of the polyol, (c) cyclic derivatives of the polyol, and (d) mixtures thereof, said heating initiating the thermal condensation; removing water formed during the thermal condensation; continuing the thermal condensation and adding a final quantity of additional reactant to the reaction mixture when the thermal condensation is within a preselected degree of completion, thereby buffering the condensation and preventing undesirable crosslinking, and prior to the condensation going to completion, admixing a phenolic hydroxyl-containing compound with the reaction mixture.

DESCRIPTION OF PREFERRED EMBODIMENTS

Polyethercyclicpolyols

Figure 1:
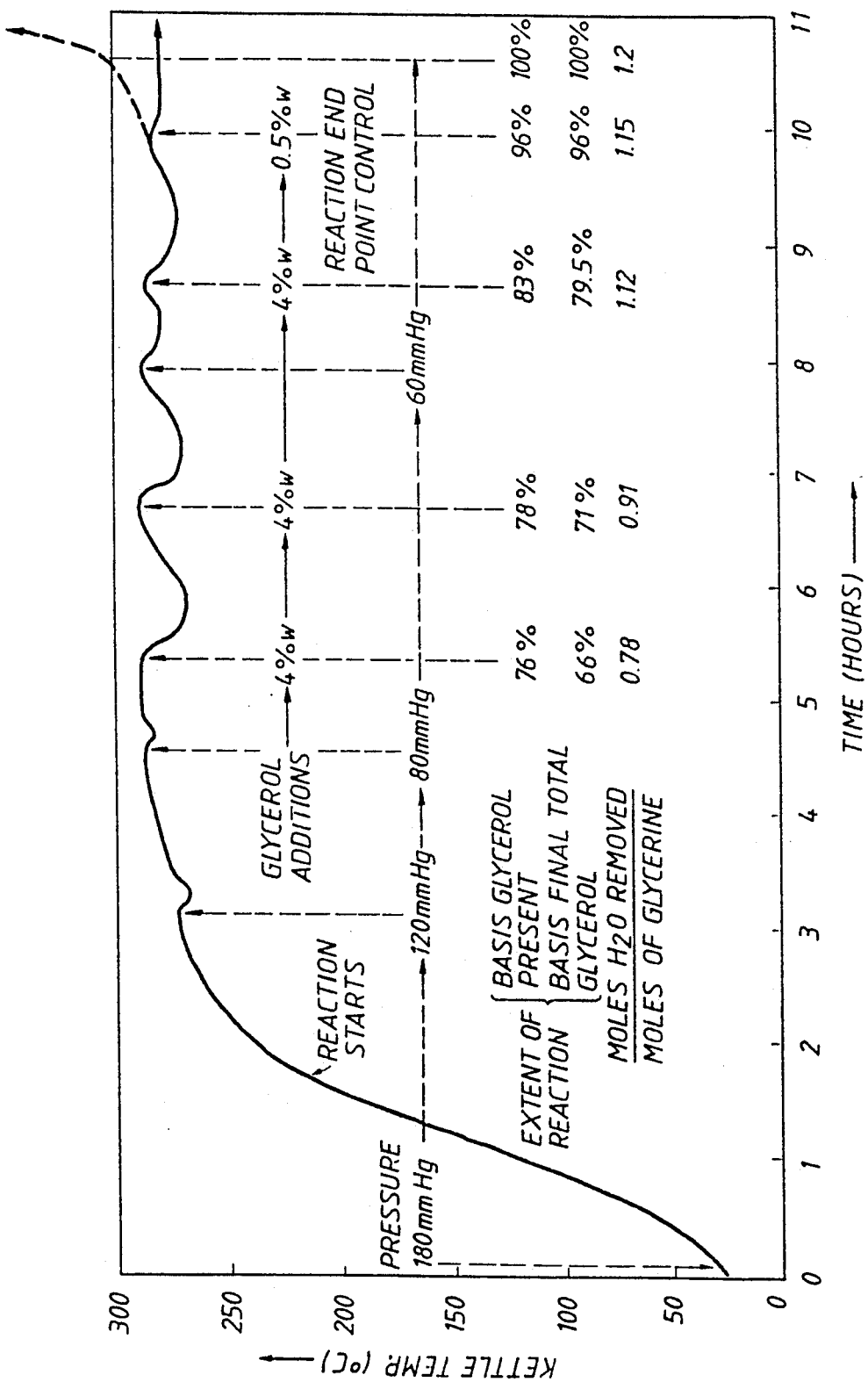
FIG. 1 shows a temperature-time plot of a glycerol condensation reaction.

Polyethercyclicpolyols are those having at least 6 carbon atoms, at least 2 hydroxyl groups, and at least 2 ether linkages, but no more than 1800 carbon atoms, 450 hydroxyl groups, and 600 ether linkages. More preferably, polyethercyclicpolyols are those having at least 15 carbon atoms, 5 ether linkages, and at least 5 hydroxyl groups, or at least 15 carbon atoms, at least 7 ether linkages, and at least 3 hydroxyl groups. Most preferably, polyethercyclicpolyols are those having at least 18 carbon atoms, at least 6 hydroxyl groups, and at least 6 ether linkages but preferably no more than 1200 carbon atoms, 300 hydroxyl groups, and 400 ether linkages. Weight average molecular weights, $M_w$, [defined infra] preferably range from 50,000 to 200,000. Hereinafter "poly" is used to mean two or more, "mono" is used to mean one, "cyclic" is used to mean one or more rings, "ether" is used to mean one or more ether linkages, and polyethercyclicpolyol may also be called PECP or polycyclicpolyetherpolyol.

Polyethercyclicpolyols may be prepared by polycondensation of compounds such as (A) through (E) in VIII (infra) in chemical processes which are accompanied by significant expulsion of water molecules from the polymerizing compounds. The number of ether linkages equals the number of water molecules expelled. Taking (C) or (D) (infra) as the building unit, the lowest molecular weight structure containing two such units is Structure (I), containing two terminal hydroxyl groups, and five ether linkages. Structure 1 is formed by condensation from glycerol molecules with the expulsion of five water molecules.

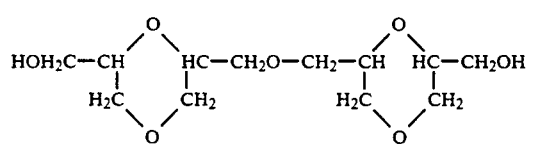

(I)

This structure is a dicyclicpoly (or penta) etherdiol, and can be called di-bis(hydroxymethyl)-1,4-p-dioxane.

Polyethercyclicpolyols also can be formed by further condensation or polycondensation of Structure (I) with itself, or with itself and with polyhydric, at least trihydric, monomers, e.g., glycerol monomers. Dimerization of structure (I) with expulsion of one mole or water yields:

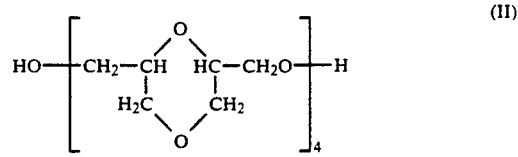

(II)

Copolycondensation of four structure (X) (infra) units with itself and with one polyhydric (at least trihydric) molecule, e.g., a glycerol molecule, can yield structure (III) and its isomeric equivalents:

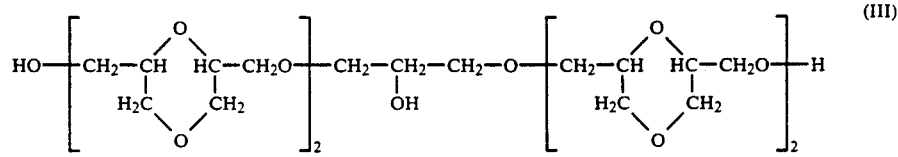

(III)

Analogous structures can be obtained from structures (X) (J), (X) (K), and (X) (N) (infra) by polycondensation. Structures based on (N) (infra) will have 5-membered rings. Spectroscopic techniques cannot conveniently distinguish between the 5- or 6-membered rings.

Structure (III) contains twelve ether linkages, three hydroxyl groups, and four six-membered cyclic diethers, and is formed by the polycondensation of nine glycerol molecules by the expulsion of twelve water molecules. The cyclic diether units and the polycondensed glycerol units, or other polyhydric (at least trihydric) units, occur randomly in the structure. Disregarding the order of occurrence, a general chemical composition formula representative of all of these structures is:

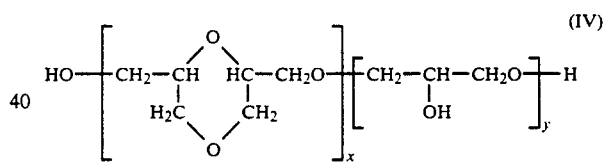

(IV)

where $x \geq 1$ and $y \geq 0$.

The above structures are illustrative and not limiting of the invention.

Polyol Feedstock

Feed compounds of certain characteristics have been found useful in the preparation of high molecular weight polyethercyclicpolyols. Polyols that are at least trihydric and have at least two hydroxy groups in a vicinal position are required. Nonlimiting examples include monomers, oligomers and telomers of polyhydric alcohols (or their precursors, or combinations thereof) such as glycerol (which is the preferred feedstock), telomers of glycerol such as diglycerols, triglycerols, tetraglycerols, pentaglycerols, and hexaglycerols, mixtures of glycerol and telomers of glycerol such as diglycerol and triglycerols, mixtures of telomers of glycerol, 1,5,6,9-decanetetrol, 1,2,4,5-cyclohexanetetramethanol, 1,2,4,7-heptanetetrol, 1,2,3,5-heptanetetrol, 4,4-dimethyl-1,2,3-pentanetriol, 1,3,4-cycloheptanetriol, 1,2,3-pentanetriol, 1,2,4-pentanetriol, 2,3,4-pentanetriol, 1,1-cyclopentanediol, 1,2,3-cyclopentanetriol, 1,2,3-hexanetriol, 1,2,4-hexanetriol, 1,2,3,4-hexanetetrol, 1,2,4-cyclohexanetriol, 1,2,5-cyclohexanetriol, 1,2,3,4-cyclohexanetetrol, 1,2,3,5-cyclohexanetetrol, sorbitol, mannitol and copolymers of ethylene glycol and propylene glycols with the preceding alcohols.

The monomeric units which can enter into the polycondensation reactions to yield desirable polyethercyclicpolyols are alcohols containing at least three hydroxyl groups per molecule of which at least two are vicinal. Thus, glycols of any molecular weight do not meet the requirements. On the other hand, triols are quite suitable. Examples are butanetriols, such as 1,2,4-butanetriol, pentanetriols, such as 1,2,3-pentanetriol, etc. An important class of polyhydric alcohols with straight carbon chains and four or more hydroxyl groups, called sugar alcohols, can also be used in preparing additive formulations containing cyclic polyethers. Sorbitol and mannitol are two such well known polyhydric alcohols.

A monomer of the structure:

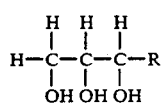
(V)

will yield several structures, one of which is illustrated by:

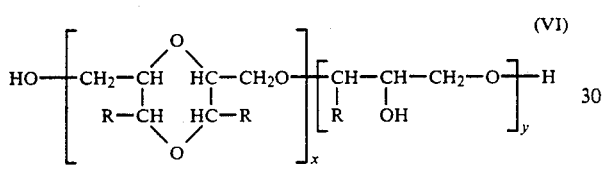
(VI)

The R group may itself be a group containing hydroxymethyl groups, which would in turn increase the potential for intermolecular condensation by expulsion of additional moles of water, and would increase the facility with which high molecular weight cyclic ether structures are obtained.

Examples of polyethercyclicpolyols obtained from trihydric alcohols with more than three carbons include the following:

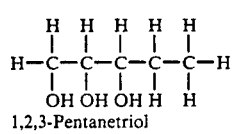
(VII)
1,2,3-Pentanetriol

The following monocyclicdietherdiols of pentanetriol are obtained from Structure VII in accordance with the methods described supra:

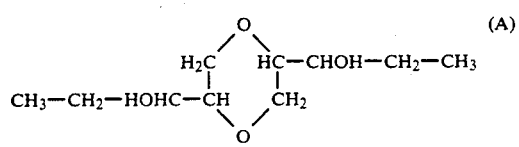
(A)

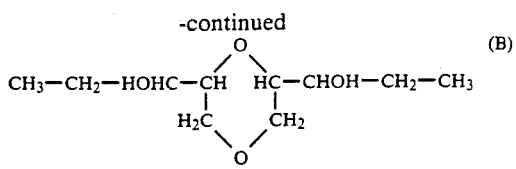
(B)

Both dimers (A) and (B) are obtained from Structure VII by reacting at carbons 1 and 2.

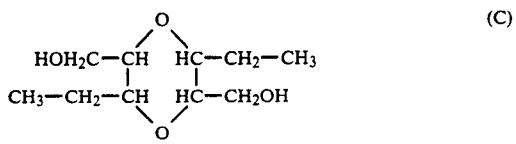
(C)

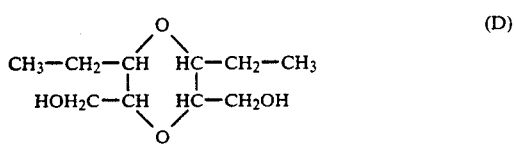
(D)

Both dimers (C) and (D) are obtained by reacting Structure (VII) at carbons 2 and 3.

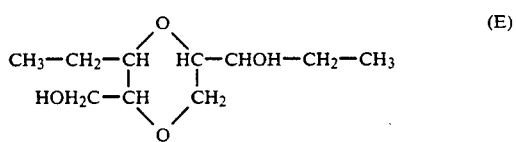
(E)

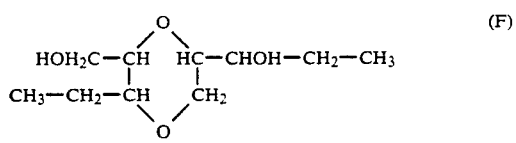
(F)

Dimers (E) and (F) are obtained from (VII) by reacting at 1,2 and at 2,3 positions.

(VIII)

Further polycondensation of the cyclicetherdiols (supra) will yield polycyclicetherpolyols with structures which depend on which hydroxyl groups are involved in the condensation reaction. For instance, reaction between Structures (VIII) A (supra) and (VIII) F (supra) will yield (IX) (infra), a dicyclicpentaetherdiol of pentanetriol as follows. Obviously, a large number of possible polycondensed structures exist.

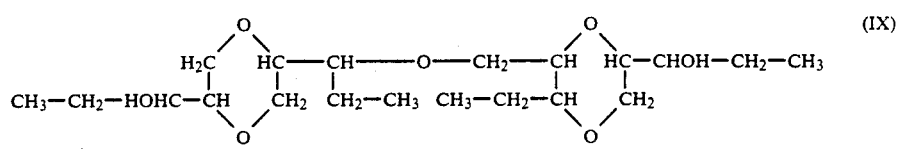
(IX)

Precursors of trihydric polyols are suitable feeds. For example, glycidol, an epoxy alcohol which is a precursor of glycerol, reacts by simple addition not involving dehydration or requiring the presence of catalysts such as sodium hydroxide and sodium acetate. Another example is epichlorohydrin which, upon reaction with water and sodium hydroxide, hydrolyzes to give glycerol and sodium chloride. This latter mixture then can be thermally condensed to yield polyethercyclicpolyols.

Representative structures of precursors of the polyols of interest as feeds in this invention are the epoxide structures (G) through (I) listed below. All of these structures satisfy the criterion of possessing at least one epoxide and one or more hydroxyl groups.

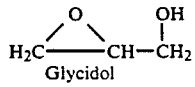
Glycidol
(G)

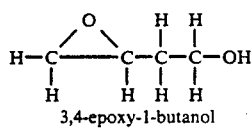
3,4-epoxy-1-butanol
(H)

The preferred structure of polyol precursors is given by:

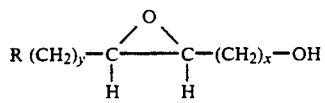
(I)

where R=alkyl, aryl, H, or OH
$X \geq 1$,
and $Y \geq 0$,
with the condition that when Y=0, then R=H.

The above precursors of epoxy alcohols can be conveniently prepared from the corresponding unsaturated alcohols by selective oxidation as shown for the case of glycidol below:

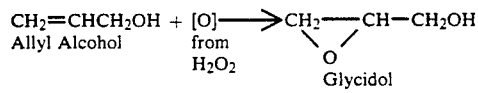

Derivatives of polyols are also useful feeds. For example, derivatives of glycerol, including linear and cyclic dimers, such as cis-or trans-2,5-bis(hydroxymethyl)-p-dioxane (J and K), cis- or trans-2,6-bis(hydroxymethyl)-p-dioxane (L and M), and the glycerine acetal of hydracrylaldehyde (N) can separately, or in combination, dimerize or can react with glycerol to produce polyethercyclicpolyols.

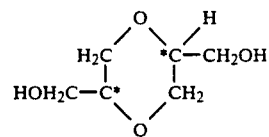
(J) and (K)
CIS or TRANS
2,5-bis(hydroxymethyl)
P-dioxane

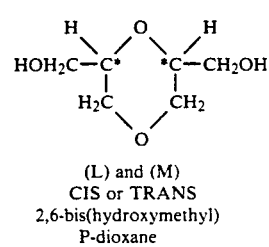
(L) and (M)
CIS or TRANS
2,6-bis(hydroxymethyl)
P-dioxane

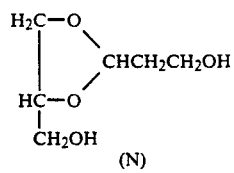
(N)
Glycerine Acetal of
Hydracrylaldehyde
(X)

In structures J through M, CIS and TRANS refer to the stereoisomerism of the carbon atoms marked by an asterisk. Structures J through M can also be called bis(-hydroxymethyl)-p-dioxanes, monocyclicdietherdiols or cyclic dimers of glycerol.

Known commercial mixtures of bis(hydroxymethyl)-p-dioxanes and polyols can react to produce polyethercyclicpolyols. Polyols, e.g., polyglycerols, of a degree of dehydration corresponding from 0.5 to 1.0 moles water per mole of polyol are suitable feedstock. Footstill bottoms (heavy ends from the manufacture of glycerol) are mixtures of glycerol, bis(hydroxymethyl)-p-dioxanes, linear polyglycerols, and small amounts of low molecular weight polyethercyclicpolyols, are useful feedstock.

Byproduct or effluent streams from other existing processes for which the principal products are resins, soaps, and the like, can be excellent feedstocks. Exemplary are process streams of glycerol/glycidol mixtures which may also contain other components, for example, mixtures of glycerol, glycidol, epichlorohydrin, dimethyl ketone, isopropyl alcohol, and/or sodium chloride made in the manufacture of resins. Such streams may first be processed to remove the nonglycerol-related material, for example, sodium chloride. Effluent streams from processes such as resin manufacture fit this category of feedstock. Such streams may contain predominantly water and salt (10 to 15 percent by weight) with also small amounts of glycerol, glycidol, bis(hydroxymethyl)-p-dioxanes, and polyethercyclicpolyols of low molecular weight (and therefore initially ineffective for the use in drilling fluids). For example, in an existing plant, the components of an effluent stream are 12 to 15 percent by weight sodium chloride, 0.3 to 2 percent by weight glycerol, 0.3 to 1.2 percent by weight glycidol, and less than 0.5 percent by weight polyglycerols, bis(hydroxymethyl)-dioxanes, and low molecular weight polyethercyclicpolyols, with the balance being water.

Process Conditions

In a typical preparation in accordance with the invention, a polyol such as glycerol (which is the preferred feedstock) containing small amounts of catalyst such as sodium hydroxide, preferably along with small amounts of sodium acetate, are reacted in distillation apparatus under conditions which allow water to be removed overhead, but not substantial amounts of glycerol or its dimers and trimers. The catalyst, alkali metal hydroxide, preferably sodium hydroxide, is in a preferred concentration of 0.5 to 1.5 percent by weight of the reaction mixture and alkali metal acetate, preferably sodium acetate, in like or smaller amounts. Other suitable catalysts include potassium, lithium or calcium hydroxide or other condensation catalysts, such as sodium tungstate or tin (IV) chloride.

The starting pH for the condensation reaction ranges from 5 to 13.5 and is preferably from 8 to 10. The pH gradually declines during the process to 5 to 9.5 and preferably to 6.5 to 9. The materials removed overhead in the distillation are acidic to neutral and have a pH ranging from 3 to 7.

The reaction mixture is heated under a pressure of at least 100 mm Hg, and preferably between 150 and 300 mm Hg. For glycerol, more preferably 160 to 230 mm Hg is used. Under these conditions, any free water, which is often present in very small amounts even in dry glycerol, will be distilled off. Moreover, water produced by the condensation reactions will be distilled off continuously, allowing the equilibrium-limited condensation reaction to proceed further and to completion. Water removal may be facilitated by bubbling an inert gas, such as nitrogen, through the mixture. Such bubbling will also ensure thorough mixing. The mixture may also be continuously stirred to ensure thermal equilibrium throughout. The dry glycerol will then begin to rise in temperature to about 210° to 230° C. at 150 to 300 mm Hg, at which temperature the mixture refluxes, indicating the onset of reactions which produce water by condensation of the glycerol. By maintaining a pressure of at least 160 mm Hg, the glycerol, which may volatilize along with the water, is condensed in an overhead condenser, which is preferably cooled by a coolant such as water/glycol mixtures. The glycerol and its linear and cyclic dimers, which form in the course of the volatilization process, are thus condensed and refluxed to the reacting mixture. Gradually the procedure results in an increase in the boiling point of the mixture, brought about by the continuous removal of water of condensation and by the increase of the molecular weight of the mixture.

As the degree of the polymerization increases, and the amount of water removed from the glycerol feed increases, the pressure over the mixture is gradually decreased externally, either in a continuous, preferably gradual, mode, or at selected reaction temperatures. For example, it is possible to reduce the pressure to 120 mm Hg when the mixture reaches 250° C. at a pressure of 180 mm Hg. Or alternatively, it is possible to control the pressure to diminish gradually by known mechanical means. FIG. 1 discloses a stepwise pressure reduction: 180 mm Hg to 120 mm Hg to 80 mm Hg to 60 mm Hg.

The degree of dehydration during the procedure is monitored in terms of moles of water removed per mole of glycerol left in the product. As the ratio of moles of water removed per mole of glycerol in the product increases, the degree of polymerization of glycerol increases, and the number average molecular weight of the mixture increases. Particularly important is the discovery of the strong relationship between the weight average molecular weight ($M_w$) and the performance of the product as a drilling fluid additive.

The number average molecular weight $M_n$ is determined by the formula:

$$M_n = \frac{\sum_i n_i M_i}{\sum_i n_i}$$

wherein i = all molecules in the sample,
$n_i$ = the number of molecules, and
$M_i$ = the molecular mass of each molecule.

This is the average molecular weight obtained when the total weight of the sample is divided by the number of molecules in the sample. This molecular weight determines the effect of the sample composition on the osmotic pressure and hence, the effect of the sample composition on the freezing point or other colligative properties of the total mixture.

The weight average molecular weight $M_w$ is determined by the formula:

$$M_w = \frac{\sum_i n_i M_i^2}{\sum_i n_i M_i}$$

This molecular weight number weighs molecules proportionally to their molecular weight in the averaging process; that is, the molecular weight $M_i$, is multiplied by the weight $n_i M_i$ of material of that molecular weight rather than by the number of molecules. This type of average reflects the effect of the sample composition on those properties which depend on the size of the individual molecules, such as effectiveness in light scattering, or ability of the molecule to penetrate into small openings or plug or cover such openings. Thus, a high $M_w$ would be beneficial if penetration of the molecules into the interplanar structure of layered clays in the formulation is to be avoided. While the invention is not limited by this theory, it is believed that when polyethercyclicpolyols of this invention are used in drilling fluids, the presence of molecules possessing large volumes minimizes the swelling of clay components in the wellbore, thereby improving wellbore stability.

The centrifuge molecular weight is determined by the formula:

$$M_z = \frac{\sum_i n_i M_i^3}{\sum_i n_i M_i^2}$$

The ratios $M_w/M_n$ and $M_z/M_w$ are also an indication of the spread or polydispersity in the molecular weight of molecules present in the sample, and by definition $M_w \geq M_n$. The ratio $M_w/M_n$ ranges from 50 to 500, and most preferably, in the best formulations of polyethercyclicpolyol, it ranges from 100 to 300. The ratio of $M_z/M_w$ ranges from 1 to 100, and in the most preferred formulations it ranges from 2 to 20. The polydispersity of molecular weights is underscored by the appearance of a characteristic binodal molecular weight distribution in virtually all thermal polyethercyclicpolyol samples.

In order to attain high $M_w$ values it is necessary to carry out dehydration as far as possible. By dehydration under gradually decreasing pressure it is possible to achieve a degree of dehydration which approaches and exceeds 1 mole of water per mole of glycerol. At this point, theoretically the glycerol feed could have polymerized to yield a single molecule of infinitely high molecular weight. However, in the course of distillation of glycerol from a basic medium, extensive cyclization takes place, which yields compounds such as cis- or trans-2,5-bis(hydroxymethyl)-p-dioxane, cis- or trans-2,6-bis(hydroxymethyl)-p-dioxane and the glycerine acetal of hydracrylaldehyde, or other 5-, 6-, or 7-membered ring structures of which the first two are predominant. The polycondensation of such cyclic structures with linear or branched polyglycerols yields polyethercyclicpolyols. Excellent polyethercyclicpolyols for drilling fluid applications can be obtained by dehydrating to the extent of 1.15 to 1.2 moles of water per mole of glycerol in the product.

Polyethercyclicpolyols are characterized by the presence of at least one and usually more than one 5- to 7-membered ring structures per individual molecule in at least 80 percent of the molecular mass. Moreover, a minimum of 20 percent, preferably 30 percent, and most preferably 40 percent, of all molecules of reactant participating in the formation of polyethercyclicpolyols are involved in cyclic structures.

The preferred way to achieve such extensive dehydration without undesirable degeneration and gelation of the polyethercyclicpolyols is by the addition of small amounts of polyol, e.g., glycerol, at a later stage of the reaction, for example, when the reaction medium temperature has reached 270° to 280° C. at a pressure of 50 to 100 mm Hg, preferably 60 to 90 mm Hg. At least 3 percent by weight of polyol should be added to that effect, although more typically larger aliquots are added not once but several times. Upon addition of 2 to 6 percent by weight of polyol, e.g., glycerol, (basis final weight of polyol added) at a point after removal, for example, of 0.8 moles of water per mole of polyol, a drop in the temperature of the reacting mixture occurs, the drop being several degrees Centrigrade or Fahrenheit. The drop is caused by the lower temperature of the polyol being added, but more importantly indicates the endothermic nature of the reaction between polyol molecules, or preferably between added polyol molecules and reactive sites in the prepolymerized mixture. For better effectiveness, the added polyol, e.g., glycerol, may be pre-saturated with alkali metal hydroxide, e.g., sodium hydroxide. FIG. 1 shows stepwise addition of polyol with corresponding temperature changes. In general the stepwise addition of glycerol should be initiated when the reaction is at least 40 percent complete (basis the amount of reactant present at the end of the reaction).

Upon continued input of heat from an external source, the temperature of the reacting mixtures rises to the previous highest level, or to a higher level, or to a somewhat lower level than the first high temperature, depending upon the molecular weight distribution of polyethercyclicpolyols in the mixture. This results in at least some of the polymerized polyol compounds achieving higher and higher molecular weights. Since the $M_w$ values are very sensitive to the presence of even small amounts of large molecules, this procedure results in increasing $M_w$ values which, generally results in improved performance in drilling mud formulations. This procedure of incremental polyol addition can be repeated any number of times, three being a convenient number. With three additions of polyol the experimental reaction time usually takes 6.5 to 7 hours, and when optimally performed, excellent polyethercyclic polyols are obtained.

The final $M_w$ values obtained are a strong function of the maximum temperature used in the polymerization reaction. Typical maximum temperatures range from 250° C. to 295° C. at a pressure 40 to 80 mm Hg, preferably 270° C. to 295° C., and most preferably 275° C. to 285° C.

As the reaction approaches 85 percent completion, it is suitable to combine polyol additions with further reductions of pressure, going down to 30 mm Hg, or even lower. This results in deeper dehydration at a given temperature and therefore in higher $M_w$ and $M_n$ values.

Termination of Reaction

As the reaction of the present invention approaches completion, it turns from being highly endothermic to being more thermally neutral, and at a dehydration approaching and exceeding 1.2 moles of water per mole of polyol it can become exothermic. This is a reflection of the propensity of the mixture to undergo rapid degeneration of the complex polyethercyclicpolyol structures. In order to avoid the occurrence of such an undesirable degeneration, it is preferred to buffer the reaction by adding a small amount of monomeric polyol such as glycerol, for example, 0.2 to 2 percent, and preferably 0.3 to 0.9 percent by weight total. Preferably, there is added 0.5 percent by weight of polyol at a selected time such as when reaction is at least 90 percent complete, or preferably at a point where the reaction is 95 percent complete, i.e., after removal of 1.12 to 1.15 moles of water per mole of polyol in the reaction medium. FIG. 1 shows reaction end point control. The dotted line shows what could happen to temperature without a final addition of polyol, as the reaction becomes exothermic, leading to substantial degeneration and the formation of sludge. After reaction is terminated the polyethercyclicpolyol is removed from the reaction kettle by dilution with at least 20% w water.

Dehydration in Relation to Feed Composition

With glycerol as the primary reaction medium, it is preferable to remove at least 1.05 and more preferably at least approximately 1.12 moles of water per mole of glycerol. Most preferably 1.15 to 1.25 moles of water per mole of glycerol in the product should be removed. If the feed contains an appreciable amount of predehydrated glycerol polymers, then the remaining dehydration will be less than 1.2 moles per mole of glycerol. As an example, for a known commercial product which typically contains 15 percent by weight of bis(hydroxymethyl)-dioxanes, and 85 percent by weight of glycerol the dehydration can be calculated as follows. For approximately 100 grams of feed there are 85 grams of glycerol (0.99 moles) and 15 grams of bis(hydroxymethyl)-dioxane (0.1014 moles). The glycerol component will have to lose $0.92 \times 1.2 = 1.104$ moles of water. The 0.1014 moles of bis(hydroxymethyl)-dioxane is derived from 0.2028 moles of glycerol by removal of 0.2028 moles of water; 1.2 total moles water per mole of glycerol should be removed, i.e., $0.2028 \times 1.2 = 0.2434$ moles. Thus, it is necessary to remove $0.2434 - 0.2028 = 0.0406$ moles of water. The total to be removed is 1.104 moles from the glycerol + 0.0406 moles from the bis(hydroxymethyl)dioxane = 1.1496 moles water (or approximately 1.145 moles) from the 100 grams of the known commercial product.

Therefore it is necessary to remove close to 1.2 moles of water for each mole of glycerol which enters into the condensation of an initially partially dehydrated glycerol feed stream. Alternatively, in most cases involving complex feed streams, it would be appropriate to carry out the reaction and select a final maximum reaction temperature at set pressure conditions, such as is known from previous experience to yield satisfactory polyethercyclicpolyol preparations.

Certain prehydrated glycerol feeds are not preferred for preparation of good quality polyethercyclicpolyol. An example is an extensively degenerated footstill bottoms (heavy ends from glycerol manufacture). In such cases, an acceptable feed may still be recovered from such materials by proper separation/purification. For example, extraction of the lower molecular weight fraction of a footstill bottom product by use of a low molecular weight alcohol, followed by recovery and reuse of the extracting alcohol. Alternatively, however, small amounts of extensively dehydrated polyglycerols can be used as additive components of the glycerol-rich feed, provided they are not unduly degenerated to yield essentially gel-like compositions.

Addition

In accordance with the present invention it has been found that the addition of minor amounts of compounds containing two or more phenolic hydroxyl functionalities, especially bisphenol A (BPA) (or 4,4'-isopropylidenediphenol), is beneficial. The addition of these compounds has a similar effect to that of adding a difunctional epoxy resin to the preparation as described in case T-2380. Addition of phenolic hydroxyl-containing compounds to the reacting glycerol or polyol medium results in the formation of higher molecular weight polyethercyclicpolyols with substantially improved properties in connection with drilling fluid additive performance.

Although bisphenol A is particularly useful, it is suitable to use other compounds containing two phenolic hydroxyls attached to one or more aromatic rings, such as catechol, resorcinol, hydroquinone, 4,4'-ethylidenediphenol or phenolic novolacs. Phenolic resins are also suitable for this application. Compounds containing three or four phenolic hydroxyls which will direct polymerization along more than one spatial direction are also suitable, such as 4,4',4''-methylidene trisphenol and 4,4',4'',4'''-ethylidene tetrakisphenol. It is theorized, although the invention is not limited to this theory, that the use of phenolic hydroxyl-containing compounds facilitates the coverage of the openings in the clay surface of an oil well through which water can enter the clay. Thus it is believed that molecules which are substantially planar in structure are most useful with the invention when it is employed as a part of a drilling fluid additive. The amount of phenol hydroxylic-containing compound used is preferably 0.5 to 10 weight percent of the total reactant mixture.

A thermal condensation run which incorporates the bisphenol A copolymerization can be realized as a continuous copolymerization or as a post-treatment step. In the former case, the material may be added in two to four aliquots, generally observing the layer addition until about 40 to 50 percent of the reaction is complete. In the latter case the copolymerization may be stopped before complete dehydration of 1.2 moles of water per mole of glycerol left in the product is actually achieved. In such a case, however, in order to ensure substantial formation of cyclic structures in the polyethercyclicpolyol it is appropriate to dehydrate at least to the level of 1.02 to 1.1 moles of water per mole of glycerol. Such a preparation would typically have $M_w$ values of 20,000 to 40,000. The bisphenol A post-treatment raises the $M_w$ by connecting lower molecular weight polyethercyclicpolyols together into larger units. This also results in the vast majority of molecules (i.e., over 90% of the individual molecules) containing at least one and preferably several cyclic structures (bis(hydroxymethyl)-p-dioxane or 5- or 7-membered rings). The resulting $M_w$ could then be raisd to the desired range of 80,000 to 160,000.

EXAMPLES

EXAMPLE 1

Simultaneous Copolymerization of Glycerol and Bisphenol A to Yield High Performance Polyethercyclicpolyols 750 g of glycerol, 21 g of bisphenol A, 5.4 g of sodium hydroxide and 3.6 g of sodium acetate are added to a 2-liter round bottom distillation flask provided with a 15-inch high, 1-inch diameter Vigreaux distillation column. The pressure is set at 180 mm Hg using a $N_2$ source and the mixture is heated to ca. 220° C., at which point the reaction sets in, evolving water vapor. In order to ensure that no large amounts of unreacted glycerol leave the unit with the overhead water product, the column is provided with a magnetic control for refluxing part of the overhead product. Since the Vigreaux column is not insulated, air cooling increases the condensation process and results in a low loss of glycerol and diglycerol components. Thus, although the magnetically controlled variable reflux is set at 1:1 back reflux to product ratio, the effective reflux ratio in this instance is closer to 3:1 back-to-product.

The reaction is allowed to proceed at 180 mm Hg until the kettle temperature reaches 250° C., at which point the pressure is reduced to 100 mm Hg. This results in a temperature drop of ca. 11° C. to 239° C. The kettle temperature gradually rises to about 258° C. at 100 mm Hg at which point the pressure is reduced to 80 mm Hg, resulting in a small temperature drop of 2° C. to 3° C. When the kettle temperature reaches 279° C. to 280° C. at 80 mm Hg, 35 g of NaOH-saturated glycerol are added to the reacting mixture, resulting in a 12° C. to 13° C. temperature drop due to the lower temperature of the glycerol, and the endothermic reactions of the freshly added glycerol. A second similar addition of glycerol is made when the kettle temperature reaches 275° C. at 80 mm Hg. The reaction mixture cools off again by about 10° C., and when the temperature gets back to 275° C. the pressure is reduced to 60 mm Hg, resulting in a slight temperature drop. When the kettle temperature rises to 275° C. again at 60 mm Hg, a third addition of 35 g of NaOH-saturated glycerol is made and the reaction is allowed to proceed to 283° C. When the total overhead collected reaches 230 cc, a final 5 g aliquot of sodium hydroxide-free glycerol is added to prevent the undesirable onset of exothermic degradation reactions. The reaction is terminated when the overhead volume reaches 241 cc. At this point the number of moles of water removed per mole of glycerol in the product is 1.19. The $M_w$ value of the polyethercyclicpolyol product obtained in a 3 column (Ultrahydrogel) gel permeation chromatography unit is expected to be 88,000 by calculation. The produced polyethercyclicpolyol will constitute an excellent drilling mud additive, which inhibits fluid loss, cuttings dispersion and clay swelling.

EXAMPLE 2

Late Addition of Bisphenol A in a Thermal Polycondensation of Glycerol to Yield Polyethercyclicpolyols In this example, 750 g of glycerol, 5.5 g of sodium hydroxide and 3.6 g of sodium acetate are introduced into the reactive distillation apparatus described in the previous Example 1. The mixture is then heated and the reaction is allowed to proceed as described in Example 1, by starting at 180 mm Hg and raising the temperature to a reaction temperature of ca. 220° C. The reaction is allowed to proceed for 5.5 hours during which two 35 g glycerol additions (NaOH-saturated) are also implemented as in Example 1. A sample of the reaction mixture is taken from the kettle at a time prior to the third glycerol addition. At this time 1.05 moles of water have been removed per mole of glycerol left in the product. Gel permeation chromatography analysis of the sample is expected by calculation to yield a $M_w$ value of 35,000. The third glycerol addition is made differently than in Example 1. In this case, a slurry of 20 g bisphenol A in 45 g of glycerol is added, along with about 1 weight percent sodium hydroxide, and is introduced when the kettle temperature reaches 285° C. at 60 mm Hg. A significant drop in the kettle temperature takes place, down to 285° C., indicating not only a temperature loss caused by the introduction of a cooler mass, but also the onset of endothermic reactions of both the added glycerol and of the bisphenol A. The reaction is allowed to proceed for another 75 minutes, at which point the moles of water removed per glycerol left in the product approach 1.15. A final addition of 4 g of glycerol is made to minimize exothermicity and the reaction is terminated at 1.21 moles of water per mole of glycerol in the product. The volume of the overhead in this example is 246 cc. The $M_w$ value of the final product is expected to be 95,000 by calculation.

EXAMPLE 3

Post-Treatment of a Low Performance Polyethercyclicpolyol with Bisphenol A to Increase $M_w$ Value A 700 g polyethercyclicpolyol sample prepared by thermal polycondensation is found to have an $M_w$ value of 40,000, with a ratio of water removed per glycerol left in the product of 1.12. The marginal performance of this polyethercyclicpolyol is improved by adding 25 g of Bisphenol A, 2 g of sodium hydroxide and 1 g of sodium acetate and heating the mixture under 200 mm Hg of $N_2$ pressure. The relatively high pressure is selected to speed up the rate of heating to about 260° C., at which temperature the partially dehydrated mixture becomes reactive again. The pressure is then reduced to 100 mm Hg and then 60 mm Hg over a short period of time (20 minutes) and an additional quantity of aqueous overhead is obtained, raising the ratio of moles of water removed per glycerol left in the product to 1.21. The $M_w$ value is expected by calculation to be 115,000 and the polyethercyclicpolyol is expected to be an excellent additive in drilling mud applications.

What is claimed is:

1. A method for preparing polyethercyclicpolyol by copolymerization and thermal condensation, comprising:
   (a) heating a reaction mixture comprising a reactant selected from the group consisting of (1) a polyol having at least three hydroxyl groups of which at least two of the hydroxyl groups are vicinal, (2) precursors of the polyol, (3) cyclic derivatives of the polyol, and (4) mixtures thereof, said heating initiating the thermal condensation;
   (b) removing water formed during the thermal condensation;
   (c) continuing the thermal condensation until at least 1.05 moles of water per mole of reactant are removed, wherein the condensation goes to completion without incurring substantial undesirable degeneration; and
   (d) prior to the condensation going to completion, admixing a phenolic hydroxy-containing compound with the reaction mixture.

2. A method for preparing polyethercyclicpolyol by copolymerization and thermal condensation, comprising:
   (a) heating a reaction mixture comprising a reactant selected from the group consisting of (1) a polyol having at least three hydroxyl groups of which at least two of the hydroxyl groups are vicinal, (2) precursors of the polyol, (3) cyclic derivatives of the polyol, and (4) mixtures thereof, said heating initiating the thermal condensation;
   (b) removing water formed during the thermal condensation;
   (c) continuing the thermal condensation, which is initially endothermic, until the condensation is essentially thermally balanced, and prior to the reaction becoming exothermic which would lead to substantial undesirable degeneration; and
   (d) prior to the condensation becoming essentially thermally balanced, admixing a phenolic hydroxy-containing compound with the reaction mixture.

3. A method for preparing polyethercyclicpolyol by copolymerization and thermal condensation, comprising:
   (a) heating a reaction mixture comprising a reactant selected from the group consisting of (1) a polyol having at least three hydroxyl groups of which at least two of the hydroxyl groups are vicinal, (2) precursors of the polyol, (3) cyclic derivatives of the polyol, and (4) mixtures thereof, said heating initiating the thermal condensation;
   (b) removing water formed during the thermal condensation;
   (c) continuing the thermal condensation to completion while controlling the temperature and pressure of the reaction within 250° C. to 795° C. and 40 mm to 80 mm of mercury to avoid substantial undesirable degeneration and to maximize molecular weight; and
   (d) prior to the thermal condensation going to completion, admixing a phenolic hydroxy-containing compound with the reaction mixture.

4. A method for preparing polyethercyclicpolyol by copolymerization and thermal condensation, comprising:
   (a) heating a reaction mixture comprising a reactant selected from the group consisting of (1) a polyol having at least three hydroxyl groups of which at least two of the hydroxyl groups are vicinal, (2) precursors of the polyol, (3) cyclic derivatives of the polyol, and (4) mixtures thereof, said heating initiating the thermal condensation;
   (b) removing water formed during the thermal condensation;

(c) continuing the thermal condensation while adding additional reactant in such a manner that the reaction proceeds to completion at a rate faster than the additional reactant is being incorporated, thereby maximizing molecular weight of the polyethercyclicpolyol; and (d) prior to the thermal condensation going to completion, admixing a phenolic hydroxyl-containing compound with the reaction mixture.

5. A method for preparing polyethercyclicpolyol by copolymerization and thermal condensation, comprising:

(a) heating a reaction mixture comprising a reactant selected from the group consisting of (1) a polyol having at least three hydroxyl groups of which at least two of the hydroxyl groups are vicinal, (2) precursors of the polyol, (3) cyclic derivatives of the polyol, and (4) mixtures thereof, said heating initiating the thermal condensation;

(b) removing water formed during the thermal condensation;

(c) continuing the thermal condensation to completion while controlling the pH of the reaction mixture within a starting pH of 5.0 to 13.5 and a final pH of 5.0 to 9.5 by addition of the basic catalyst; and (d) prior to the condensation going to completion, admixing a phenolic hydroxy-containing compound with the reaction mixture.

6. A method for preparing polyethercyclicpolyol by thermal condensation, comprising:

(a) heating a reaction mixture comprising a reactant selected from the group consisting of (1) a polyol having at least three hydroxyl groups of which at least two of the hydroxyl groups are vicinal, (2) precursors of the polyol, (3) cyclic derivatives of the polyol, and (4) mixtures thereof, said heating initiating the thermal condensation;

(b) removing water formed during the thermal condensation;

(c) continuing the thermal condensation and adding a final quantity of additional reactant to the reaction mixture when the thermal condensation is within at least 90% of completion, thereby buffering the condensation and preventing undesirable degeneration; and (d) prior to the condensation going to completion, admixing a phenolic hydroxy containing compound with the reaction mixture.

7. The method of claim 1 wherein the admixed phenolic hydroxyl-containing compound is 0.5 to 10 weight percent of the total reactant mixture.

8. The method of claim 7 wherein the phenolic hydroxyl-containing compound is selected from the group consisting of bisphenol A, catechol, hydroquinone, resorcinol, 4,4',4''-methylidenetrisphenol and 4,4',4'',4'''-ethylidene tetrakisphenol.

9. The method of claim 1 wherein the reactant is glycerol and at least 1.05 moles of water per mole of the glycerol are removed.

10. The method of claim 7 wherein least 1.12 moles of water per mole of glycerol are removed.

11. The method of claim 8 wherein 1.15 to 1.25 moles of water per mole of glycerol are removed.

12. The method of claim 1 wherein the reactant is a mixture including glycerol and cyclic derivatives of the glycerol and wherein the moles of water removed per mole of the cyclic derivatives of glycerol is equal to at least 1.05 minus the moles of water which would have been removed in thermally condensing the cyclic derivatives of the glycerol from a glycerol feedstock.

13. The method of claim 1 wherein the reactant is glycerol and additional glycerol is added to the reaction mixture after the thermal condensation is at least 40 percent complete, basis the amount of reactant present at the end of the reaction.

14. The method of claim 13 wherein the added glycerol is at least 3 percent by weight of the total glycerol.

15. The method of claim 1 wherein the reactant is glycerol and a minor quantity of glycerol is added to the reaction mixture when the thermal condensation is at least 90 percent complete.

16. The method of claim 15 wherein the minor quantity of glycerol is added to the reaction mixture when the thermal condensation is at least 95 percent complete.

17. The method of claim 15 wherein the added glycerol is 0.2 to 2.0 percent by weight of the total reactant mixture.

18. The method of claim 15 wherein the added glycerol is 0.3 to 0.9 percent by weight of the total reactant mixture.

19. The method of claim 1 including controlling the temperature of the reaction mixture to stay below a maximum within the range of 250° to 295° C. at a pressure of 40 to 80 mm Hg.

20. The method of claim 19 wherein the maximum temperature of the reaction mixture is within the range of 270° to 295° C.

21. The method of claim 19 wherein the maximum temperature of the reaction mixture is within the range of 275° to 285° C.

22. The method of claim 1 wherein an alkali hydroxide catalyst is employed to control the starting pH of the reaction within a range of 5 to 13.5, and the final pH of the reaction mixture within a range of 5 to 9.5.

23. The method of claim 22 wherein the starting pH is controlled within a range of 8 to 10 and the ending pH is controlled within a range of 6.5 to 9.

24. The method of claim 1 wherein sodium chloride is present in the reactant mixture.

25. The method of claim 1 wherein the initial condensation pressure is selected so that water is the principal overhead product.

26. The method of claim 25 wherein the reactant is glycerol and the initial condensation pressure is at least 100 mm Hg.

27. The method of claim 25 wherein the reactant is glycerol and the initial condensation pressure is at least 150 mm Hg.

28. The method of claim 25 wherein the reaction mixture is continuously stirred to ensure thermal equilibrium throughout.

29. The method of claim 25 wherein inert gas is bubbled through the reaction mixture to ensure thorough mixing and to facilitate water removal.

30. The method of claim 25 wherein, at the completion of the condensation, a minimum of 20% w water, basis total reaction mixture, is added to the reaction mixture to facilitate dissolution and removal of the polyethercyclicpolyols.

31. The method of claim 25 wherein the reaction from initial water evolution to termination takes a time period of four to ten hours.

* * * * *